United States Patent
Roman et al.

(10) Patent No.: US 10,742,536 B2
(45) Date of Patent: Aug. 11, 2020

(54) DEVICE FOR SIMULATING A COMMUNICATION RELAY

(71) Applicant: BULL SAS, Les Clayes sous Bois (FR)

(72) Inventors: Alexandre Roman, Hyéres (FR); Julien Richard, Vitrolles (FR)

(*) Notice: Subject to any disclaimer, the term of this patent is extended or adjusted under 35 U.S.C. 154(b) by 0 days.

(21) Appl. No.: 15/776,318

(22) PCT Filed: Nov. 15, 2016

(86) PCT No.: PCT/EP2016/077753
§ 371 (c)(1),
(2) Date: May 15, 2018

(87) PCT Pub. No.: WO2017/085067
PCT Pub. Date: May 26, 2017

(65) Prior Publication Data
US 2018/0331936 A1    Nov. 15, 2018

(30) Foreign Application Priority Data
Nov. 16, 2015 (FR) .................................. 15 02392

(51) Int. Cl.
*H04L 12/26* (2006.01)
(52) U.S. Cl.
CPC .................................. *H04L 43/50* (2013.01)
(58) Field of Classification Search
CPC ......... H04B 1/005; H04B 1/405; H04B 1/406
See application file for complete search history.

(56) References Cited

U.S. PATENT DOCUMENTS

| | | | | |
|---|---|---|---|---|
| 4,507,781 A | * | 3/1985 | Alvarez, III | ......... H04B 7/2643 358/435 |
| 5,475,677 A | * | 12/1995 | Arnold | ................... H04B 1/005 370/280 |
| 7,826,447 B1 | * | 11/2010 | Bishara | ............... H04L 12/4641 370/216 |

FOREIGN PATENT DOCUMENTS

EP    2 068 471 A1    6/2009

OTHER PUBLICATIONS

Ivanic et al, "Testing Android Devices for Tactical Networks: A Hybrid Emulation Testbed Approach" [on applicant IDS].*
International Search Report as issued in International Patent Application No. PCT/EP2016/077753, dated Jan. 13, 2017.
(Continued)

*Primary Examiner* — Ranodhi Serrao
(74) *Attorney, Agent, or Firm* — Pillsbury Winthrop Shaw Pittman LLP

(57) ABSTRACT

A device for simulating a communication relay for at least one device for processing tactical data, includes a data storage system; a first connection interface for connection with the device for processing tactical data; a second communication interface; a processor connected to the storage system and to the interfaces, the processor being configured so as to: divide a temporal cycle having a first predetermined duration into time slots of a second predetermined duration, each time slot being identified by an index in the temporal cycle; monitor the network traffic over the second communication interface; emit a message via the first interface for all the indices of slots except for slots identified by a list of at least one excluded index; broadcast a message via the second interface for the slots identified by the list of at least one excluded index.

8 Claims, 2 Drawing Sheets

(56) References Cited

OTHER PUBLICATIONS

Ivanic, N., et al., "A Scalable Testbed for Emulating Wireless Mobile AD-HOC Networks," Military Communications Conference, Nov. 2008, XP031408380, ISBN: 978-1-4244-2676-8, pp. 1-5.

Serban, C., et al., "Testing Android Devices for Tactical Networks: A Hybrid Emulation Testbed Approach*," Milcom 2015 Track 4—System Perspectives, Military Communications Conference, Oct. 2015, XP032830914, pp. 489-494.

* cited by examiner

DEVICE FOR SIMULATING A COMMUNICATION RELAY

CROSS-REFERENCE TO RELATED APPLICATIONS

This is the U.S. National Stage of PCT/EP2016/077753, filed Nov. 15, 2016, which in turn claims priority to French Application No. 1502392, filed Nov. 16, 2015, the entire contents of all applications are incorporated herein by reference in their entireties.

TECHNICAL FIELD OF THE INVENTION

The field of the invention is that of Radios of the 4th Generation or PR4G. More precisely the field of the invention is that of qualifying equipment able to communicate through a PR4G.

A PR4G is a radio equipment used in military operations theatres. One of the particularities of a PR4G is its ability to establish communications according to Time Division Multiple Access protocol, or TDMA protocol.

PRIOR ART

In prior art one is confronted with the necessity of being able to qualify a piece of equipment. Such a qualification is the guarantee that the functionality of the equipment is effective. To carry out this qualification the functionality has to be tested.

Many pieces of equipment are designed to communicate with a PR4G. However, in light of the sensitive nature of the PR4G, it is not equipment that is easily available. The qualification of a piece of equipment communicated with a PR4G, and in particular of its communication function, therefore poses a problem.

Before qualification, the development itself is problematic. Indeed, a qualification can be planned in terms of the date as well as in terms of duration, while a development has a random duration. In these conditions of unpredictable duration, it is even more difficult to be entrusted with a PR4G.

In addition, even if such a loan were to be granted, a PR4G is a radio intended to function in a hostile environment while still retaining a range of 50 kms. This means that remaining constantly in the vicinity of one, or several, PRG4s that are operating can be detrimental to health, due to the transmitting power. However, during a development phase, the person or persons who are carrying out these operations, most often in an office, are almost continuously soliciting the communication function. The levels of radio exposure that would result from using the actual PR4G could be problematic if no precaution were to be taken.

In prior art these problems are addressed by an instrumentation of the system to be qualified in order to allow it to communicate without having recourse to a PR4G. However in this configuration the device is not qualified with a PR4G, it is qualified as being capable of communicating.

DISCLOSURE OF THE INVENTION

The invention aims to overcome all or a part of the disadvantages of prior art identified hereinabove, and in particular to propose means that allow for the qualification of a device for processing tactical data without having recourse to a PR4G. The invention discloses how it is possible to simulate a PR4G with software means and as such to have a device for processing tactical data believe that it is effectively connected to a PR4G.

In this scheme, an aspect of the invention relates to a device for simulating a communication relay for at least one device for processing tactical data, characterized in that the device for simulating comprises:
  A data storage system;
  A first connection interface for connection with the device for processing tactical data;
  A second communication interface;
  A processor connected to the storage system and to the interfaces, the processor being configured so as to:
    Divide a temporal cycle having a first predetermined duration into time slots of a second predetermined duration, each time slot being identified by an index in the temporal cycle;
    Monitor the network traffic over the second communication interface;
    Emit a message via the first interface for all the indices of slots except for slots identified by a list of at least one excluded index;
    Broadcast a message via the second interface for the slots identified by the list of at least one excluded index.

In addition to the main characteristics that have just been mentioned in the preceding paragraph, the device according to the invention can have one or several additional characteristics among the following, considered individually or according to technically permissible combinations:
  The content of the messages emitted via the first interface is received via the second interface;
  The processor is configured to filter the messages;
  the communications via the second interface carried out using the UDP protocol;
  A message received via the second comprises an identifier of a device for simulating a communication relay;
  A message received via the second interface comprises a radio channel identifier;
  The device for simulating is a device for processing tactical data.

BRIEF DESCRIPTION OF THE FIGURES

Other characteristics and advantages of the invention shall appear when reading the following description, in reference to the accompanying drawings, which show.

For more clarity, identical or similar elements are marked with identical reference signs on all of the figures.

The invention shall be better understood when reading the following description and when examining the accompanying figures. The latter are shown for the purposes of information and in no way limit the invention.

DETAILED DESCRIPTION OF AN EMBODIMENT

Figure 1:
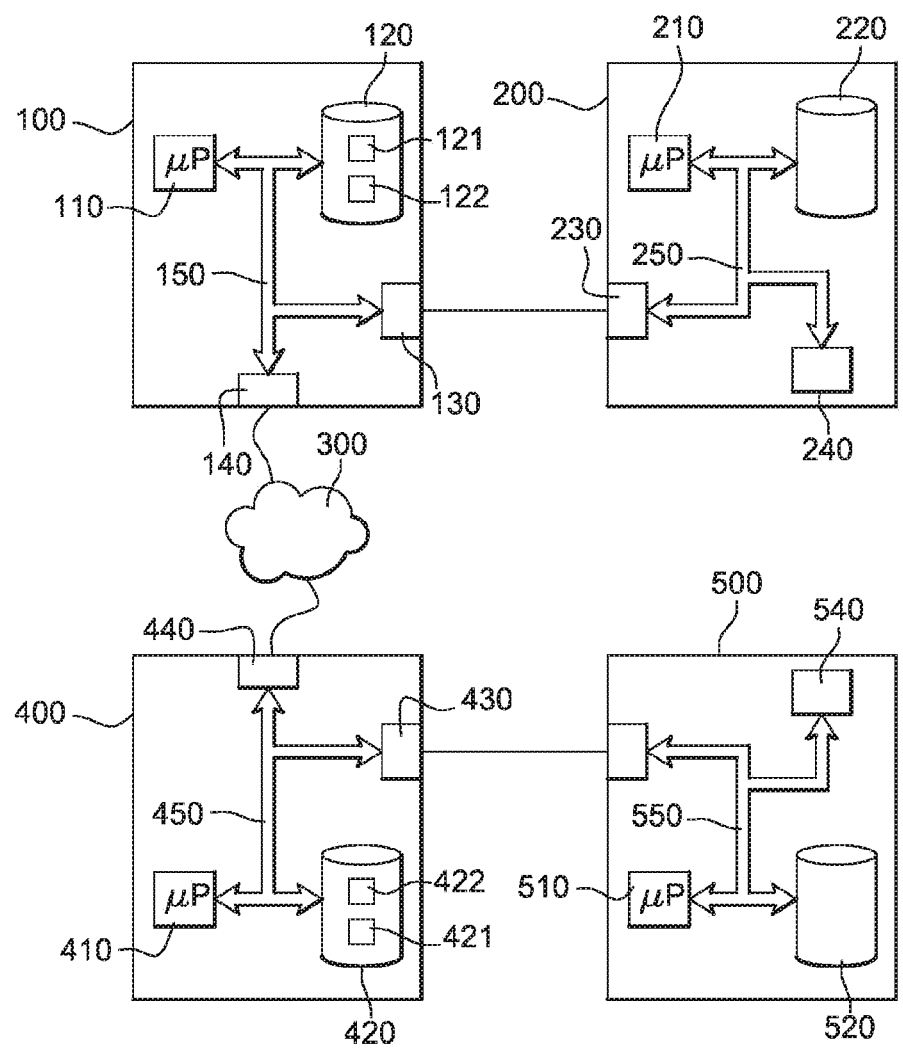
FIG. 1, an illustration of an embodiment of the invention.

FIG. 1 shows a first device 100 for simulating a communication relay. The first device for simulating a communication relay comprises:
  A microprocessor 110;
  Storage means 120, for example a hard drive whether local or remote, whether fixed or removable, whether single or in a grid (for example RAID);

A first communication interface 130, for example a serial interface of the RS232 type, able to establish a connection with a first device 200 for processing tactical data;

A second communication interface 140, for example a communication card according to the Ethernet protocol. Other protocols can be considered such as "Fibre Channel" or InfiniBand.

The microprocessor 110 of the first device for simulating, the storage means 120 of the first device for simulating, the first communication interface 130 of the first device for simulating and the second interface 140 of the device for simulating are connected together by a bus 150.

When an action is lent to a device the latter is in fact carried out by a microprocessor of the device controlled by instruction code recorded in a memory of the device. If an action is lent to an application, the latter is in fact carried out by a microprocessor of the device in a memory of which the instruction codes that correspond to the application are recorded. When a device, or an application emits a message, this message is emitted via a communication interface of said device or of said application.

The storage means of the first device for simulating comprise:

A zone 121 for simulating comprising instruction codes that correspond to the implementation of the invention and that allow the first device for simulating to behave, from the standpoint of the first device for processing, as a PR4G;

A zone 122 of filters comprising instructions for filtering messages.

FIG. 1 shows a first device 200 for processing tactical data. The first device for processing tactical data comprises:

A microprocessor 210;

Storage means 220;

A communication interface 230 that can be connected to the first communication interface of the first device for processing tactical data;

A screen 240, for example a touch screen.

The microprocessor 210 of the first device for processing, the storage means 220 of the first device for processing and the communication interface 230 of the first device for processing are connected together by a bus 250.

A device for processing tactical data and a device implementing a SIC program: Combat and Information System, for example SICS. This can be a Smartphone, a tablet, a computer and more generally any device for processing.

FIG. 1 shows a second device 400 for simulating a communication relay. The second device for simulating a communication relay is structurally identical to the first device for simulating. As such the second device for simulating comprises:

A microprocessor 410;

Storage means 420, comprising:

A zone 421 for simulating identical to the zone 121 for simulating of the storage means of the first device for simulating;

A first communication interface 430;

A second communication interface 440;

A bus 450 to connect its components together.

FIG. 1 shows a second device 500 for processing tactical data. The second device for processing tactical data is structurally identical to the first device for processing tactical data. As such the second device comprises:

A microprocessor 510;

Storage means 520;

A communication interface 530;

A screen 240.

FIG. 1 shows that:

The first device for simulating is connected to the second device for simulating through a network 300. This is for example an Ethernet network;

The second device for simulating is connected to the second device for processing.

FIG. 1 shows physical devices. In practice the various devices can be all or only a part of them virtualized. In the case of a virtualization of a device for processing tactical data, the corresponding communication interfaces are virtualized too. It is as such possible to have all of the virtualized devices on a single physical machine.

Figure 2:
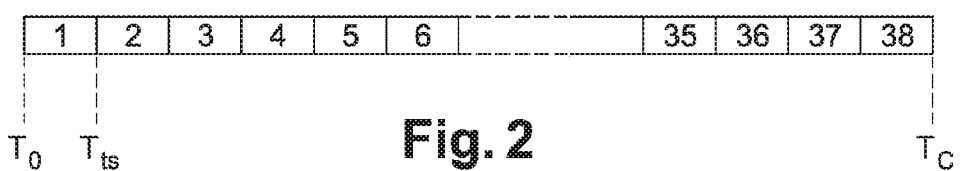
FIG. 2, an illustration of a TDMA cycle.

It will be understood that there are other alternative implementations. For example, the following can be considered:

Two devices for processing tactical data connected to the same device for simulating;

Three or more devices for simulating;

FIG. 2 shows a temporal cycle 900. Such a temporal cycle repeats, with the end of a cycle marking the beginning of the following cycle. Such a cycle has a predetermined duration Tc. The cycle 900 is divided into time slots. A time slot has a predetermined duration Tts. In a cycle each slot has an index. That is to say each time slot of the time cycle is numbered.

In a known manner, for the PR4G in TDMA mode, a temporal cycle comprises 38 time slots of 100 ms. In practice a cycle can last up to 128 slots.

Figure 3:
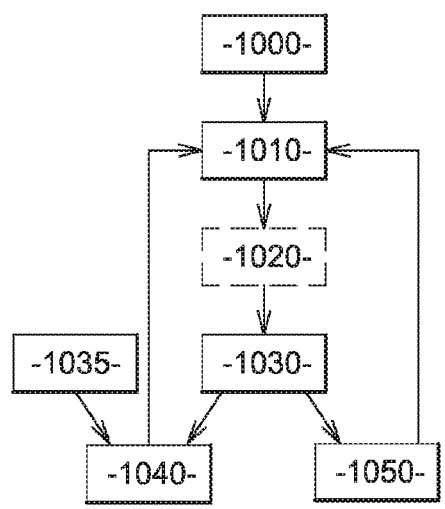
FIG. 3, an illustration of the steps of the method implemented by the invention.

FIG. 3 a step 1000 of dividing a temporal cycle that has a duration Tc into time slots of a duration Tts. This step is implemented by a device for simulating, for example the first device 100 for simulating. This division is carried out by at least the management in a memory of the device for simulating of a structure representing the cycle, i.e. of a structure comprising one record per time slot.

A time slot record comprises at least:

A slot identifier: for this purpose the index of the slot is used;

An operating mode, with a mode able to be:

Emission: the device for simulating emits data via the second interface during this slot, Reception: the device for simulating receives data via the second interface during this slot.

This management makes it possible to define a list of indexes referred to as excluded, this is the list of indexes that correspond to slots that are in the Emission mode. In practice, for a PR4G, such a list comprises from 1 to 3 indices. But the invention remains valid with lists that contain more indexes.

Once the division has been performed, the first device for simulating passes to a step 1010 of monitoring the network traffic on the second communication interface. This traffic is monitored according to the UDP protocol and on a predetermined port of the network. In addition, all of the messages emitted are emitted in broadcast mode. The port UDP in question is a parameter of the first device for simulating. In the invention all of the devices for simulating share this configuration. As such each data packet emitted by a device for simulating is received by all of the other devices for simulating.

In order to simulate a TDMA connection, a device for simulating according to the invention therefore emits UDP packets, each packet is structured and comprises at least:

An identifier of the device for simulating;

A time slot identifier, i.e. a time slot index value;

A TDMA useful load corresponds to the data to be transmitted. This useful load must not be confused with the UDP useful load. The TDMA useful load is included in the UDP useful load.

In an alternative of the invention a UDP packet also comprises:

A radio sub-channel identifier which makes it possible to simulate the use of sub-channels of the PR4G.

Thanks to the use of UDP broadcasting, each device for simulating can detect the others. This broadcasting mode also makes it possible to set up a method for electing a master device for simulating that ensures the synchronization of the broadcast. This method is triggered periodically in such a way as to make the network more resistant to the disappearance of the master.

In an alternative, the device passes, for each UDP packet received at a step of filtering 1020. In the step of filtering the device for simulating behaves as a firewall. The rules applied are those of the zone 122 of filters of the storage means of the device for simulating. The criteria for filtering are, for example:

The identifier of the device for simulating;
The time slot identifier;
etc.

If a message corresponds to a filtering rule then the processing thereof by the device for simulating is interrupted.

This operation is interesting in order to make it possible to simulate a communication between two PR4G through a third. Consider, in the same network, three devices for simulating with each one designated by an identifier: DS1, DS2, DS3. Then if DS1 is configured to filter the packets coming from DS3 and DS3 to filter the packets coming from DS1, in this case the communications between DS1 and DS3 must pass through DS2 as would be the case in a theatre of operations if DS1 and DS3 were separated by more than 50 kms, but less than 100 kms, and DS2 is located between DS1 and DS3.

The fact that the devices for simulating can be discovered automatically also makes it possible to have an interface for configuring filters that is simplified. Indeed, for the possible values of filtering, it is sufficient to use the values discovered by listening to the network.

From the step of filtering, or from the step of monitoring according to the alternatives, control moves to the step 1030 of routing according to the mode of the time slot.

If this is a slot corresponding to the Reception mode then control passes to a step 1050 of emitting a message to the first device for processing tactical data. If this is a slot corresponding to the Emission mode then control passes to a step 1040 of emitting a message via the second communication interface.

In the step 1050 of emitting a message to the first device for processing tactical data, the first device for simulating produces and emits a message to the first device for processing tactical data. The content of this message corresponds to a message received by the first device for simulating for a time slot in Reception mode. That is to say that the first device for simulating emits a message via the first interface for all of the slot indexes except for slots identified by the list of indexes referred to as excluded.

In the step 1040 of emitting a message via the second communication interface the first device produces and broadcasts a UDP message via the second communication interface. The content of this message depends on either:

A prior step 1035 wherein the first device for processing tactical data has sent a message, even empty or a message meaning "I have nothing to say purpose I am here», to the first device for simulating. It is the content of this message of the first device for processing which is used as the useful content of the message broadcast by the first device for simulating;

A step wherein the device for simulating has received a message via the second interface for a time slot in reception associated by configuration to the time slot in the current Emission.

After the step of emitting a message via the second interface and after the step of emitting a message to the first device for processing, the first device for simulating continues monitoring the network.

Although the steps are described in a sequential manner, it is obvious that they can be implemented in parallel, for example through the use of a reserve of request managers, with each manager corresponding to a process capable of managing a message.

The invention as such makes it possible to simulate a communication between the first device for processing tactical data and the second device for processing tactical data. Indeed:

A message emitted by the first device for processing to the first device for simulating is broadcast by the first device for simulating;

All of the messages broadcast by the first device for simulating are received by the second device for simulating;

All of the messages received by the second device for simulating are emitted to the second device for processing data.

This explanation is also valid for the messages emitted by the second device for processing data to the second device for simulating.

With the invention it is therefore efficiently possible to simulate the radio functions of a PR4G, in particular those that correspond to the use of the TDMA.

The invention claimed is:

1. A device for simulating a communication relay for at least one device for processing tactical data, the simulation device comprising:

a data storage system;
a first connection interface for connection with the device for processing tactical data;
a second communication interface;
a processor connected to the storage system and to the first connection interface and the second communication interface, the processor being configured so as to:
    divide a temporal cycle having a first predetermined duration into time slots of a second predetermined duration, each time slot being identified by an index in the temporal cycle;
    monitor network traffic over the second communication interface;
    emit a message via the first connection interface for all indices of slots except for slots identified by a list of at least one excluded index;
    broadcast a message via the second communication interface for the slots identified by the list of at least one excluded index,
    wherein each time slot identified by an index in the temporal cycle is associated with either (a) an emission mode in which the device for simulating a communication relay emits data via the second interface during said time slot or (b) a reception mode in which the device for simulating a communication relay receives data via the second interface during said time slot, said time slot associated with the emission mode being identified by one excluded index in said list of at least one excluded index.

2. The device for simulating a communication relay according to claim 1, wherein a content of the message emitted via the first connection interface is received via the second communication interface.

3. The device for simulating a communication relay according to claim 1, wherein the processor is configured to filter the messages.

4. The device for simulating a communication relay according to claim 1, wherein the communications via the second communication interface are carried out using the UDP protocol.

5. The device for simulating a communication relay according to claim 1, wherein a message received via the second communication interface comprises an identifier of a device for simulating a communication relay.

6. The device for simulating a communication relay according to claim 1, wherein a message received via the second communication interface comprises a radio channel sub-identifier.

7. The device for simulating a communication relay according to claim 1, wherein the device for simulating the communication relay is a device for processing tactical data.

8. The device for simulating a communication relay according to claim 1, wherein the data storage system includes instruction codes that allow said device for simulating a communication relay to behave, from a standpoint of the device for processing tactical data, as a device that is configured to establish communications according to Time Division Multiple Access protocol.

* * * * *